United States Patent
Harada

(10) Patent No.: US 8,255,157 B2
(45) Date of Patent: Aug. 28, 2012

(54) NAVIGATION DEVICE AND METHOD OF CONTROLLING NAVIGATION DEVICE

(75) Inventor: Tomohiro Harada, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 84 days.

(21) Appl. No.: 12/670,348

(22) PCT Filed: Jul. 18, 2008

(86) PCT No.: PCT/JP2008/062991
§ 371 (c)(1),
(2), (4) Date: Jan. 22, 2010

(87) PCT Pub. No.: WO2009/014079
PCT Pub. Date: Jan. 29, 2009

(65) Prior Publication Data
US 2010/0191457 A1    Jul. 29, 2010

(30) Foreign Application Priority Data
Jul. 23, 2007    (JP) ................... 2007-190401

(51) Int. Cl.
*G01C 21/00* (2006.01)
*G05D 1/00* (2006.01)

(52) U.S. Cl. ............. 701/426; 701/1; 701/24; 701/400; 701/412; 701/428

(58) Field of Classification Search .................. None
See application file for complete search history.

(56) References Cited

U.S. PATENT DOCUMENTS
6,201,948 B1 * 3/2001 Cook et al. .................... 434/350
6,427,063 B1 * 7/2002 Cook et al. .................... 434/350
(Continued)

FOREIGN PATENT DOCUMENTS
JP    07-271824    10/1995
(Continued)

OTHER PUBLICATIONS
International Preliminary Report on Patentability and English translation of the Written Opinion of the International Searching Authority, issued in International Patent Application No. PCT/JP2008/062991, mailed Feb. 18, 2010.

*Primary Examiner* — Ian Jen
(74) *Attorney, Agent, or Firm* — McDermott Will & Emery LLP

(57) ABSTRACT

A navigation device that can easily select information matched with user's favorite or intention from information on many stores and facilities is provided. In a car navigation device 1 for performing a route guidance of a moving object, plural symbols featured by individualities are displayed on a display panel 2, and when any one of the plural displayed symbols is selected, sightseeing information relevant to the individuality of the selected symbol is selected from the sightseeing facilities data base 31, and the selected sightseeing information is displayed on the display panel 2.

7 Claims, 11 Drawing Sheets

U.S. PATENT DOCUMENTS

| | | | |
|---|---|---|---|
| 6,839,628 B1* | 1/2005 | Tu | 701/426 |
| 6,856,901 B2* | 2/2005 | Han | 701/532 |
| 6,983,203 B1* | 1/2006 | Wako | 701/533 |
| 7,076,741 B2* | 7/2006 | Miyaki | 715/837 |
| 7,191,059 B2* | 3/2007 | Asahara | 701/410 |
| 7,623,966 B2* | 11/2009 | Butler, Jr. | 701/426 |
| 2002/0133551 A1* | 9/2002 | Ohba et al. | 709/205 |
| 2003/0032418 A1* | 2/2003 | Suzuki et al. | 455/419 |
| 2005/0051623 A1* | 3/2005 | Okuda et al. | 235/384 |
| 2005/0085999 A1* | 4/2005 | Onishi | 701/211 |
| 2005/0131645 A1* | 6/2005 | Panopoulos | 701/214 |
| 2005/0182773 A1* | 8/2005 | Feinsmith | 707/100 |
| 2009/0037101 A1* | 2/2009 | Koike et al. | 701/209 |
| 2009/0143975 A1* | 6/2009 | Geelen | 701/200 |

FOREIGN PATENT DOCUMENTS

| | | |
|---|---|---|
| JP | 09-153145 | 6/1997 |
| JP | 2003-227722 | 8/2003 |
| JP | 2004-037292 | 2/2004 |
| JP | 2005-207977 | 8/2005 |

* cited by examiner

| FACILITIES | POSITION (LONGITUDE/ LATITUDE) | ICON | RELEVANT CHARACTER | FACILITY TYPE | IMAGE | DETAILED INFORMATION |
|---|---|---|---|---|---|---|
| 40 | 41 | 42 | 43 | 44 | 45 | 46 |
| ○○ SKI RESORT | (XA·YA) | ICON A | CHARACTER A | PLAY | IMAGE A | FACILITY NAME: ○○ SKI RESORT; TELEPHONE NUMBER 00-111-22; ADDRESS ... |
| ○× PARK | (XB·YB) | ICON B | CHARACTER B | SEE | IMAGE B | FACILITY NAME: ○× PARK; TELEPHONE NUMBER 00-222-33; ADDRESS: ×× ... |
| ×× GALLERY | (XC·YC) | ICON C | CHARACTER C | SEE | IMAGE C | FACILITY NAME: ×× GALLERY; TELEPHONE NUMBER 000-11-33; ADDRESS: ×× ... |
| ×○ RESTAURANT | (XD·YD) | ICON D | CHARACTER D | EAT | IMAGE D | FACILITY NAME: ×○ RESTAURANT; TELEPHONE NUMBER 0-11-111; ADDRESS: ○○ ... |
| ... | ... | ... | ... | ... | ... | ... |

| CHARACTER | NAME | TYPE | COMMENT | SELF INTRODUCTION |
|---|---|---|---|---|
| CHARACTER A | OWL | CULTURE TYPE | ERUDITE KING OF INTELLIGENT CULTURE | "CASTLES BUILT IN EDO PERIOD …". |
| …. | …. | …. | …. | …. |

51 52 53 54 55

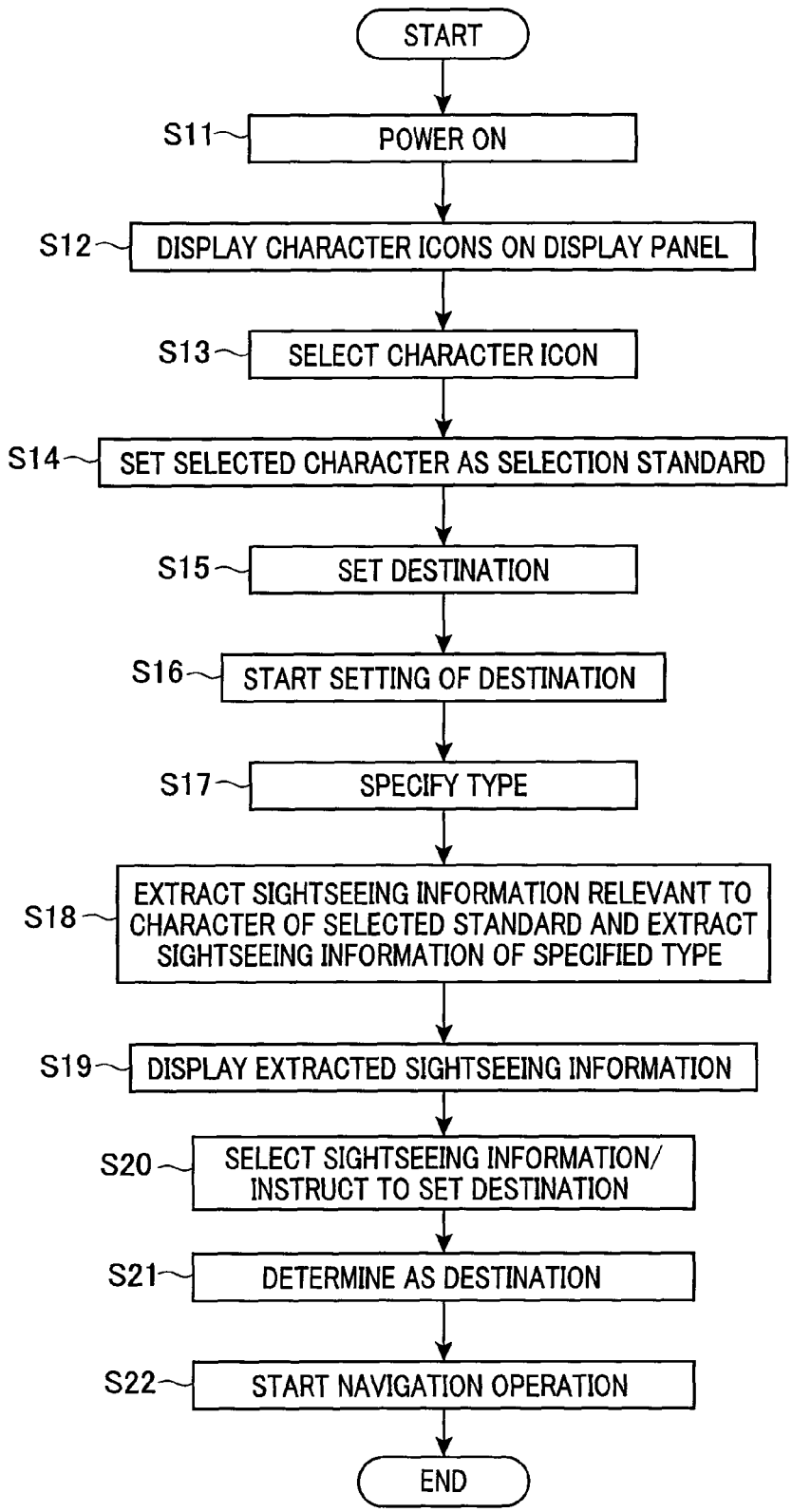

NAVIGATION DEVICE AND METHOD OF CONTROLLING NAVIGATION DEVICE

RELATED APPLICATIONS

This application is the U.S. National Phase under 35 U.S.C. §371 of International Application No. PCT/JP2008/062991, filed on Jul. 18, 2008, which in turn claims the benefit of Japanese Application No. 2007-190401, filed on Jul. 23, 2007 the disclosures of which Applications are incorporated by reference herein.

TECHNICAL FIELD

The present invention relates to a navigation device for performing a route guidance and a method of controlling the navigation device.

BACKGROUND ART

Navigation devices having a function of guiding information on stores and facilities have recently become widespread, and information on a large number of shores and facilities have been supplied. A user can select his/her desired shores and facilities from a larger number of stores and facilities. However, for example, with respect to a large scale business district, a navigation device holds information on a extremely large number of shores and facilities, and thus it has been very difficult for a user to select his/her desired stores and facilities from these stores and facilities. Therefore, there has been proposed a navigation device that automatically analyzes user's preference on the basis of user's operations and automatically selects stores and facilities matched with the analyzed preference (for example, see Patent Document 1). A navigation device disclosed in Patent Document 1 detects user's preference on the basis of a record of user's selecting operation on stores and facilities, and selects information concerning stores and facilities matched with this preference. According to the navigation device as described above, the navigation device could operate in accordance with user's preference if the user uses the navigation device in a usual style.

Patent Document 1: JP-A-2004-37292

DISCLOSURE OF THE INVENTION

Problem to be Solved by the Invention

However, when a device for analyzing user's preference irrespective of user's own intention as well as the navigation device disclosed in Patent Document 1 is used, user's preference which is not perceived by the user is reflected to the operation of the device, so that the user feels a sense of discomfort or the operation of the device may not be matched with user's intension. Furthermore, when the user is going to select stores or facilities which are inclined to be different from the user's usual preference or user's individuality, normal user's preference is selected against user's intension, and thus there is a risk that user's amusement such as unexpectedness or novelty is lost. When the operation of the device is determined along the automatically analyzed user's preference, it is undeniable that an operation which is not desired by the user may be implemented. On the other hand, a work of self-analyzing and inputting user's preference or personality by the user himself/herself is troublesome and cumbersome, and the operability of the navigation device is lost.

As described above, it has been very difficult to select information matched with user's preference or intention from information about an extremely large number of stores and facilities.

Therefore, the present invention has an object to provide a navigation device that can easily select information matched with user's preference or intention from information concerning an extremely large number of stores and facilities without increasing the load to be imposed on user's operation.

Means of Solving the Problem

In order to solve the above object, according to the present invention, a navigation device for performing a route guidance of a moving object is characterized by comprising: sightseeing information storing means for storing sightseeing information; display control means for displaying plural symbols featured by respective individualities on a display screen; sightseeing information selecting means for selecting, from the sightseeing information storing means, sightseeing information relating to individuality of any symbol selected from the plural symbols displayed on the display screen when the symbol concerned is selected from the plural symbols; and information display control means for displaying the sightseeing information selected by the sightseeing information selecting means on the display screen.

According to this construction, when the symbol symbols featured by the individualities are displayed on the display screen and some of these plural symbols is selected by a user, the sightseeing information relating to the individuality of the selected symbol is selected and displayed. That is, the sightseeing information is selected from a lot of sightseeing information on the basis of the individuality of the symbol selected by the user, so that the sightseeing information can be quickly selected in accordance with the user's intention. Here, the selection of the sightseeing information is performed in accordance with a vague criterion as information relating to the individuality of the symbol. Therefore, this device does not require any clear and standardized benchmark such as genre, store name, price or the like, and thus the user is not required to specify a clear benchmark by himself or herself. Accordingly, there is an advantage that sightseeing information is selected with the user's intention being reflected by a user's simple operation of intuitively selecting a symbol on the display screen.

Furthermore, the individuality by which the symbol is featured is brought with complexity and manifold aspects, whereby a feature which is different from an individuality expected when a user selects a symbol is brought out. As a result, sightseeing information which the user does not intend can be selected. In this case, an unexpected choice can be made to produce an amusement.

In the above construction, the display control means displays the plural symbols on the display screen at the same time or while these symbols are switched to one another.

In this case, not only the user can select a desired symbol from the plural symbols displayed simultaneously on one screen, but also the user can select a symbol in the construction that the symbol to be displayed is switched together with the screen. Accordingly, a simple screen construction can be adopted in consideration of a list display, and also the amusement can be enhanced by giving variety to the screen construction. Accordingly, there is an advantage that the degree of freedom of design can be enhanced.

Furthermore, in the above construction, the symbol may be displayed on the display screen with a color, a shape or the combination thereof which evokes the individuality by which the symbol concerned is featured.

In this case, the individuality by which the symbol concerned is featured is evoked from the color of the symbol, the shape of the symbol or the combination thereof which is displayed on the display screen. Therefore, the user can intuitively select a symbol matched with user's preference or feeling without receiving an explanation on the individuality of each symbol or the like.

Still furthermore, in the above construction, the display control means may display explanation information to explain the individuality by which the symbol is featured.

In this case, the user can recognize the individuality allocated to the symbol by watching the explanation information for explaining the individuality of the symbol, and then easily select a desired symbol. Therefore, proper information can be supplied to the user who wants sufficient information, thereby assisting user's determination on selection of a symbol. Accordingly, comfortable operation can be implemented.

Still furthermore, in the above construction, the sightseeing information storing means may store the sightseeing information type by type, and the sightseeing information selecting means may select the sightseeing information relating to the individuality of a selected symbol from the sightseeing information storing means, and also further select the sightseeing information of the indicated type from the selected sightseeing information.

In this case, the sightseeing information is selected on the basis of both the individuality of the symbol selected by the user and the type selected by the user, and thus there is an advantage that the sightseeing information can be selected with reflecting user's preference or intention more greatly.

Still furthermore, in the above construction, the sightseeing information storing means may store symbol relevant information representing the related symbol every sightseeing information in advance, and the sightseeing information selecting means may select sightseeing information relating to the individuality of the selected symbol from the sightseeing information storing means on the basis of the symbol relevant information stored in the sightseeing information storing means.

In this case, on the basis of the symbol relevant information stored every sightseeing information in advance, the user can select the sightseeing information relating to the individuality of the selected symbol quickly and surely.

Furthermore, in order to solve the above problem, according to the present invention, a method of controlling a navigation device for performing a route guide of a moving object is characterized in that a navigation device having sightseeing information storing means for storing sightseeing information is controlled to display plural symbols featured by respective individualities on a display screen, select sightseeing information relating to the individuality of any symbol from the sightseeing information storing means when the symbol concerned is selected from the plural symbols displayed on the display screen, and display the selected sightseeing information on the display screen.

According to this method, the plural symbols featured by the individualities are displayed on the display screen, and when some of these symbols is selected by the user, the sightseeing information relating to the individuality of the selected symbol is selected and displayed. That is, the sightseeing information is selected from a large amount of sightseeing information on the basis of the individuality of the symbol selected by the user, and thus the sightseeing information can be quickly selected in accordance with the user's intention. Here, the selection of the sightseeing information is performed according to a vague criterion relating to the individuality of a symbol. Therefore, Therefore, this device does not require any clear and standardized benchmark such as genre, store name, price or the like, and thus the user is not required to specify a clear benchmark by himself or herself. Accordingly, there is an advantage that sightseeing information is selected with the user's intention being reflected by a user's simple operation of intuitively selecting a symbol on the display screen.

Furthermore, the individuality by which the symbol is featured is brought with complexity and manifold aspects, whereby a feature which is different from an individuality expected when a user selects a symbol is brought out. As a result, sightseeing information which the user does not intend can be selected. In this case, an unexpected choice can be made to produce an amusement.

Effect of the Invention

According to this invention, through the operation of selecting a symbol, the sightseeing information is selected on the basis of the individuality by which the symbol concerned is featured. Therefore, the sightseeing can be quickly selected from a large amount of sightseeing information in accordance with user's intention.

BRIEF DESCRIPTION OF THE DRAWINGS

FIG. 3 is a diagram showing the construction of a sightseeing facilities data base.

FIG. 4 is a diagram showing the construction of a character data base.

FIG. 11 is a flowchart showing the operation of the car navigation device.

Figure 1:
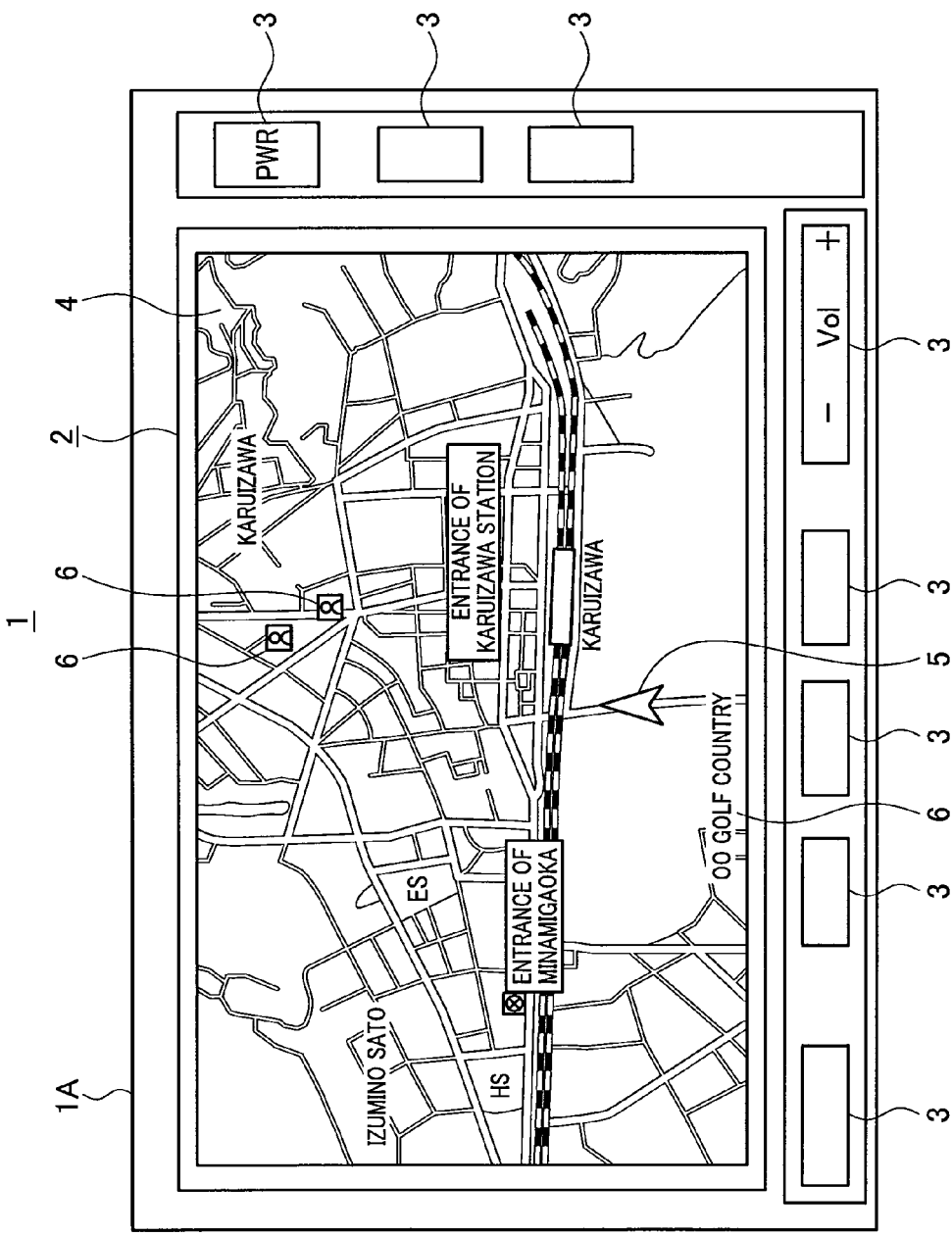
FIG. 1 is a diagram showing the construction of a car navigation device according to an embodiment to which the present invention is applied.

DESCRIPTION OF REFERENCE NUMERALS 1 car navigation device (navigation device)
2 display panel (display screen)
3 operation button
4 map
10 controller (display control means, sightseeing information selecting means, information display control means)
11 GPS unit
12 display unit
13 operating unit 14 storage unit
20 CPU
24 touch panel
30 route guidance data base
31 sightseeing facilities data base (sightseeing information storing means)
32 character data base
61 character icon
62 character explaining information
63 character site
64 bus
65 moving instructing icon
66 message display

BEST MODES FOR CARRYING OUT THE INVENTION

Embodiments according to the present invention will be hereunder described in detail with reference to the accompanying drawings. In the following description, a car navigation device mounted in a vehicle as a moving object is exemplified as an embodiment of a navigation device.

FIG. 1 is a front view showing the outlook of a car navigation device 1 according to an embodiment.

The car navigation device 1 has a device main body 1A secured in a vehicle, a display panel 2 as a display screen fitted in the front face of the device main body 1A, and plural operation buttons 3 disposed around the display panel 2.

A map 4 surrounding the current position of the vehicle having the car navigation device 1 mounted therein and a current position mark 5 representing the current position of the vehicle are superposed and displayed on the display panel 2. Furthermore, landmarks 6 representing various kinds of facilities by figures, symbols and pictures are also superposed and displayed on the map 4. These kinds of landmarks 6 contain public facilities such as offices of prefectural and city governments, administrative institutions, police offices, fire stations, schools, parks, galleries, museums, etc., accommodations such as hotels, etc., traffic facilities such as stations, air ports, harbors, interchanges, traffic lights, tunnels, etc., and private facilities such as gas stations, convenience stores, fast food stores, golf courses, etc. It is needless to say that these landmarks 6 may be displayed on the map 4 by names.

Furthermore, when a destination is input and indicated to the car navigation device 1, a route extending from the current position to the destination is highlighted on the map 4, and a route guidance is made. In the route guidance, a route display using the map 4 is performed and also a guidance of the travel direction is performed by voices.

Figure 5:
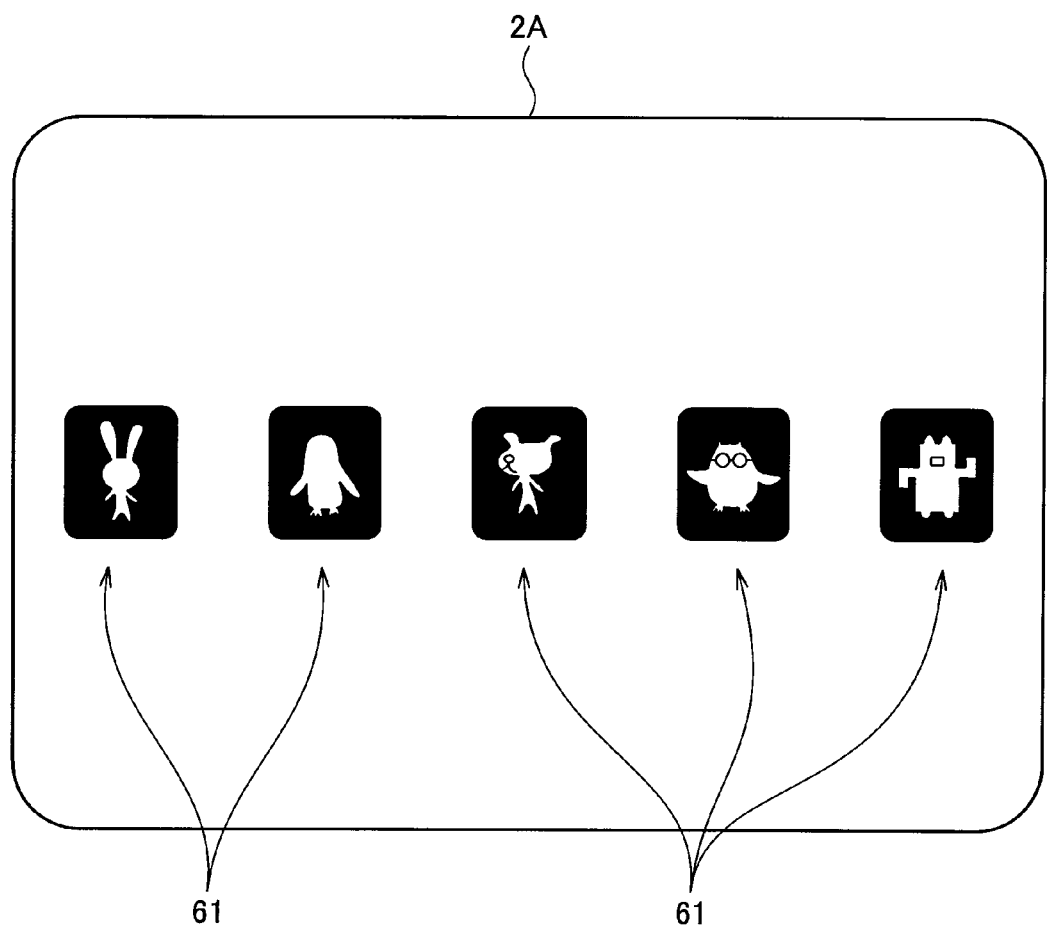
FIG. 5 is a diagram showing an example of the construction of a character selecting screen displayed on a display panel.

Furthermore, as shown in FIG. 5, the car navigation device 1 displays plural character icons 61 as symbols on the display panel 2 before a route guiding operation (navigation operation). Each character icon 61 symbolizes a virtual character, and each character is characterized by an individuality (characteristic, personality or a thing represented as a feature).

When a user selects one character icon 61 from plural character icons 61 displayed on the display panel 2, the car navigation device 1 displays the selected character icon 61 as a guide during the navigation operation on the display panel 2. Furthermore, the car navigation device 1 implements an operation of selecting and displaying sightseeing facilities or the like according to the individuality of the selected character icon 61, etc.

The construction and operation of the car navigation device 1 will be hereunder described in detail.

Figure 2:
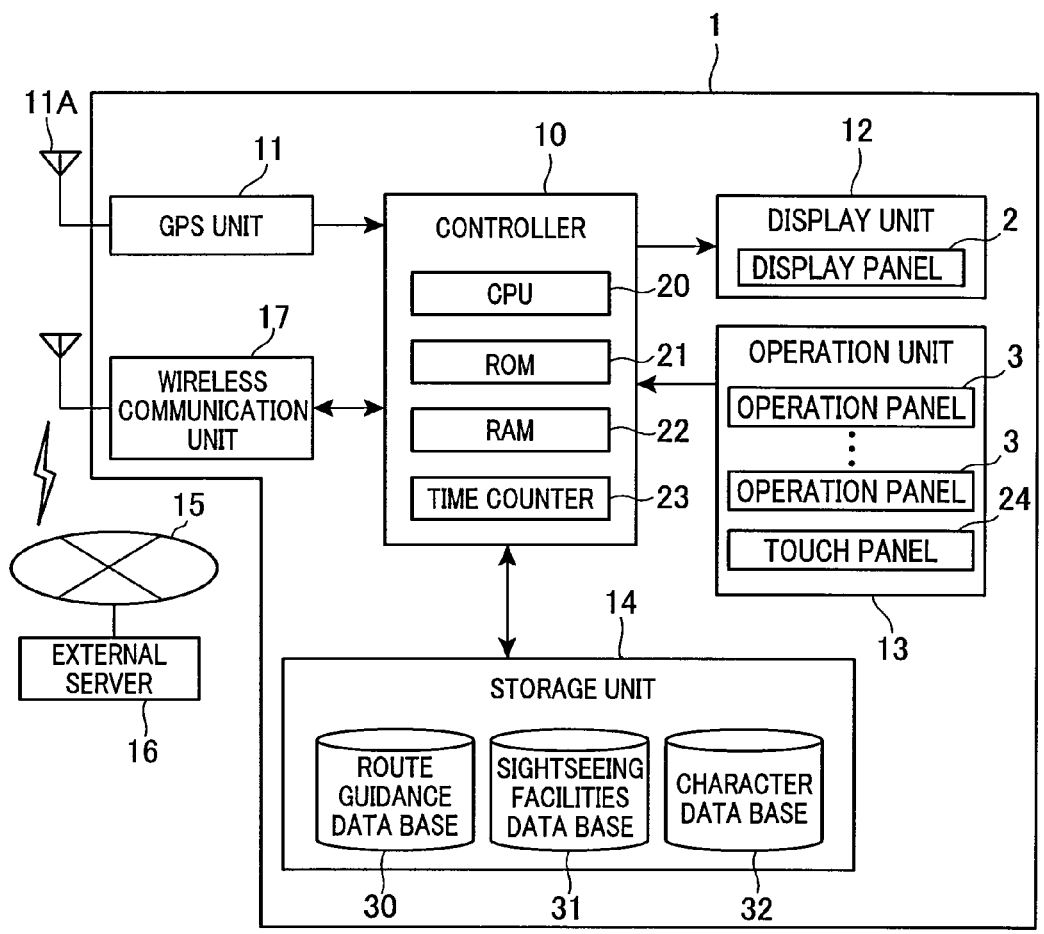
FIG. 2 is a block diagram showing the functional construction of a car navigation device.

FIG. 2 is a block diagram showing the functional construction of the car navigation device 1.

The car navigation device 1 has a controller 10 for centrically controlling the respective parts, a GPS (Global Positioning System) unit 11 for detecting the current position of the vehicle, a display unit 12 having the display panel 2, an operating unit 13 having the plural operation buttons 3, a storage unit 14 for storing various kinds of programs and data, and a wireless communication unit 17 for communicating with an external server 16 through a network 15.

The controller 10 is constructed to have CPU 20 for performing calculation processing according to programs, ROM 21 for storing various kinds of programs and data, and RAM 22 functioning as a work area for CPU 20, and the controller 10 further contains a clock circuit and a date and hour count unit 23 for counting the date and hour. Furthermore, the controller 10 executes various kinds of processing concerning characters by using information stored in a sightseeing facilities data base 31 in a storage unit 14 and a character data base 32 described later. In this processing, the controller 10 corresponds to display control means, sightseeing information selecting means and information display control means.

The GPS unit 11 receives a GPS electric wave from a GPS satellite through a GPS antenna 11A, obtains current position information representing the longitude and latitude of the current position of the vehicle from a GPS signal superposed on the GPS electric wave by calculation, and outputs the current position information to the controller 10.

In addition to the GPS unit 11, a gyro sensor, a vehicle speed sensor and an acceleration sensor may be provided to the car navigation device 1 so that self-supporting navigation can be performed.

Under the control of the controller 10, the display unit 12 displays information for route guidance such as the map 4, the current position mark 5 representing the current position of the vehicle, a route to the destination and various kinds of landmarks 6. An FM multiple broadcasting receiver or an optical/radio beacon receiver may be provided to the car navigation device 1 so that VICS (Vehicle Information and Communication System) information can be received, and this VICS information may be displayed on the display unit 2.

The operating unit 13 is equipped with a touch panel 24 superposed on the display panel 2 of the display unit 12 in addition to the plural operating buttons 3. When the user touches the display panel 2 by his or her finger, a signal representing the touch place is input to the controller 10. When the signal is input to the controller 10, the controller 10 compares the signal with the positions of the various kinds of buttons displayed on the display panel 2, and specifies which button has been touched. Furthermore, when not a button, but a landmark 6 is displayed at the touched place, the controller 10 interprets that the landmark 6 concerned is selected by the touch.

The wireless communication unit 17 is connected to the network 15 such as the Internet or the like, and transmits/receives various kinds of data communications with an external server through the network 15. For example, the wireless communication unit 17 receives updated map data, a route guidance data base 30 described later, a sightseeing facilities data base 31, updated data of data stored in the character data base 32, etc. from the external server 16.

The storage unit 14 stores information by using a magnetic or optical recording medium or semiconductor storage device which has a relatively large data storage area. Specifically, it is constructed to have a hard disk drive device, a CD/DVD drive device or the like.

In the storage unit 14 are stored various kinds of programs for the car navigation device 1 which contain a control program for route guidance, data relating to these programs, etc.

Furthermore, the storage unit 14 has a route guidance data base 30 in which various kinds of data for route guidance such as the map 4, the landmarks 6, etc. The route guidance data base 30 also contains position information representing the longitudes and latitudes of the facilities represented by the landmarks 6. In addition to the route guidance data base 30, the storage unit 14 has the sightseeing facilities data base 31 as sightseeing information storing means and the character data base 32.

The sightseeing facilities data base 31 mainly compiles a data base of facilities and places which persons visit for tourism, outdoor amusement or sightseeing as a main object (hereinafter referred to as "sightseeing facilities"). For example, the sightseeing facilities contain historic buildings, framed buildings, galleries, amusement facilities such as amusement parks, zoos, etc., landscape spots and sightseeing resorts, and also the surroundings of these facilities and landscape spots and restaurants existing at sightseeing resorts are contained in the sightseeing facilities. It is needless to say that the facilities at the landmarks 6 may be overlapped with the sightseeing facilities. Furthermore, the sightseeing facilities stored in the sightseeing facilities data base 31 of this embodiment contain eating and drinking establishments which persons visit for easing and drinking as a main object in addition to the facilities which mainly aim at tourism, outdoor amusement and sightseeing described above. These eating and drinking establishments are stored as independent sightseeing facilities in the sightseeing facilities data base 31 even when they exist around the sightseeing facilities or the landscape spots or at places irrelevant to the sightseeing resorts.

FIG. 3 is a diagram showing the construction of the sightseeing facilities data base 31.

As shown in FIG. 3, in the sightseeing data base 31, one record is stored for one sightseeing facility, and each record corresponds to the sightseeing information described above. Each record of the sightseeing facilities data base 31 contains a facility field 40, a position field 41, an icon field 42, a relevant character field 43, a facility type field 44, an image field 45 and a detailed information field 46.

The facility field 40 stores a name, a common name or an identification symbol to uniquely specify each sightseeing facility.

The position field 41 stores position data in which the position of the sightseeing facility is represented by the longitude and latitude thereof.

The icon filed 42 stores icon data in which sightseeing facilities are represented by abstractive figures, symbols or pictures, or stores link information representing storage places for the icon data in the storage unit 14. The icon data are used when the sightseeing facilities are displayed on the map 4.

The icon data are substantially the same as the data of the landmarks 6. However, in order to discriminate the figures, symbols and pictures representing the sightseeing facilities from the landmarks 6, these data will be referred to as "icons". When the sightseeing facilities are identical to the facilities of the landmarks 6, the data of the landmarks 6 are used as icon data for these facilities.

The relevant character field 43 stores relevant characters every sightseeing facility. In the car navigation device 1, as described later, characters having various individualities can be selected, and sightseeing facilities can be selected on the basis of the individualities of the selected characters. The relevant character field 43 is referred to when a sightseeing facility is selected on the basis of the individuality of the character. For example, when a character A is selected by the user, the controller 10 selects sightseeing facilities relevant to the individuality of the character A. In this processing, the controller 10 refers to the relevant character field 43 of each record of the sightseeing facilities data base 31, and when sightseeing facilities for which the record concerned is "character A" are selected, the sightseeing facilities relevant to the character can be selected/extracted.

The number of characters stored in the relevant character field 43 is not limited to one, and it may be set to plural characters. In this case, one sightseeing facility is relevant to plural characters, however, the relationship between the character and the sightseeing facility is not limited to one-to-one correspondence. Therefore, one sightseeing facility may be relevant to plural characters.

The information of the relevant character field 43 corresponds to the symbol relevant information described above.

The facility type field 44 stores genres (categories) to which sightseeing facilities belong. In this embodiment, sightseeing facilities suitable for excursion and sightseeing such as galleries, zoos and landscape spots are classified into a "see" category, and facilities suitable for easing and resting such as restaurants, etc. are classified into "eat" category. The genres (categories) corresponding to the sightseeing facilities are stored in the facility type field 44.

The image field 45 stores images such as photographs, etc. for introducing the sightseeing facilities thereof. For example, when sightseeing facilities are buildings, photographs of exterior appearances of the buildings are stored. When sightseeing facilities are landscape spots, scenic shots are stored. Furthermore, when sightseeing facilities are restaurants, photographs of exterior appearances of the restaurants or photographs of dishes are stored. Images such as symbol marks or the like may be stored in place of photographs.

The detailed information field 46 mainly stores character-based information such as the names, addresses and contact information of sightseeing facilities. When charges required to use facilities such as admission charges, etc. are predetermined, the charges may be stored in detailed information.

The information in the sightseeing facilities data base 31 may be collectively accumulated and managed in the external server 16 managed by a content distributor, and transmitted to the car navigation device 1 through the network 15. In this case, a construction of pull-distributing information from the external server 16 to the car navigation device 1 is not used, but a construction of push-distributing information in response to an information distribution request from the car navigation device 1 is used. Accordingly, unnecessary information is prevented from being transmitted to the car navigation device 1, traffic is reduced and the communication time is shortened.

FIG. 4 is a diagram showing the construction of the character data base 32.

As is apparent from FIG. 4, one record is stored for one character in the character data base 32. A character ordering code field 51, a name field 52, a type field 53, a comment field 54 and a self-introduction field 55 are contained in each record of the character data base 32.

The character ordering code field 51 stores codes for identifying and sorting respective characters for processing, such as numbers or the like which are allocated to the respective characters. In this embodiment, alphabets are allocated as codes to the respective characters.

The name field 52 is a field for storing the names of the characters. The names stored in the name field 52 are terms of endearment. The codes stored in the character ordering code field 51 described above are used to identify the characters in the processing to be executed by the controller 10.

The type field 53 is a field for storing the types of characters. For example, the type of the character A is set as "culture group", and other types such as "sport type", "healing type", "teen-girl type", "cutie-girl type", etc. are stored in the records of the respective characters.

The comment field 54 store a sentence or character array which simply explains the individuality of each character. The self-introduction field 55 stores a sentence or text which is output as words of each character itself. A sentence or a text stored in the self-introduction field 55 introduces each character.

As not shown, image data (display information) for displaying character icons 61 on the display panel 2 are stored in the character data base 32, and these image data are associated with the respective characters. Here, each record of the character data base 32 may be provided with a field in which information for specifying image data corresponding to each character, such as a file name, a path, etc. of the image data is stored.

The information stored in the name field 52, the type field 53, the comment field 54 and the self-introduction field 55 contained in each record of the character data base 32 is used as explanation information for explaining the character.

FIG. 5 is a diagram showing an example of the construction of a character selecting screen displayed on the display panel 2 of the car navigation device 1.

When the car navigation device 1 is powered on, a character selecting screen 2A is displayed on the display panel 2 under the control of the controller 10 before the navigation operation is started.

Plural selectable character icons 61 are displayed on the character selecting screen 2A. The character icons 61 are symbols having predetermined colors which comprise pictures imitating animals or plants, symbols, various kinds of figures (containing geometric configurations such as circle, polygon, etc. and non-geometric configurations), and they may contain a character or a character array. Furthermore, the character icon 61 may be colored with the same color as the background color so that it looks transparent.

An individuality (represented as a character, a personality or a feature) is set to a character represented by each character icon 61, and the character icon 61 has a color, a shape or a combination thereof which evokes the individuality of each character.

Character icons 61 imitating a rabbit, a penguin, a dog, an owl and a robot are displayed on the character selecting screen 2A shown in FIG. 5. Individualities which are evoked from the shapes of the rabbit, the penguin, the dog, the owl and the robot are set to these character icons 61.

When a user touches any one of the character icons 61 displayed on the character selecting frame 2A, the one character icon 61 is selected. After this selecting operation, during the navigation operation of the car navigation device 1, the selected character icon 61 serves as a guide for guiding the user, and plays a role to propose various kinds of information to the user and assist user's actions.

Out of the respective character icons 61 displayed on the character selecting screen 2A of FIG. 5, the character icon 61 imitating a rabbit is an icon for a character featured by an individuality of "cute", "small" and "mignon", and it has a rabbit shape so as to evoke the individuality of "cute", "small" and "mignon". Likewise, the character icon 61 imitating an owl is an icon for a character featured by an individuality of "intelligent" and "knowledgeable", and thus it imitates the shape of an owl which evokes this individuality.

In addition to the examples displayed on the character selecting screen 2A of FIG. 5, character icons which evoke individualities by only colors may be used. For example, when the shapes of all the character icons are rectangular, a character featured by an individuality of "passionate" and "active" may be represented by a red rectangle, a character featured by an individuality of "intelligent" may be represented by a blue rectangle, and a character featured by an individuality of "calm" and "natural" may be represented by a green rectangle.

As described above, the character icons 61 are displayed on the display panel 2 in colors, shapes or combinations thereof which evoke the individualities of the respective characters, for example, so that many persons can image individualities of the above characters. Furthermore, the character icon 61 may contain a character or a character array which evokes the individuality thereof.

When the user selects a character icon 61 under the state that the character selecting screen 2A shown in FIG. 5 is displayed, it is convenient for the user to known the individualities of the respective characters. Therefore, the car navigation device 1 can display the individualities of the respective character icons 61.

Figure 6:
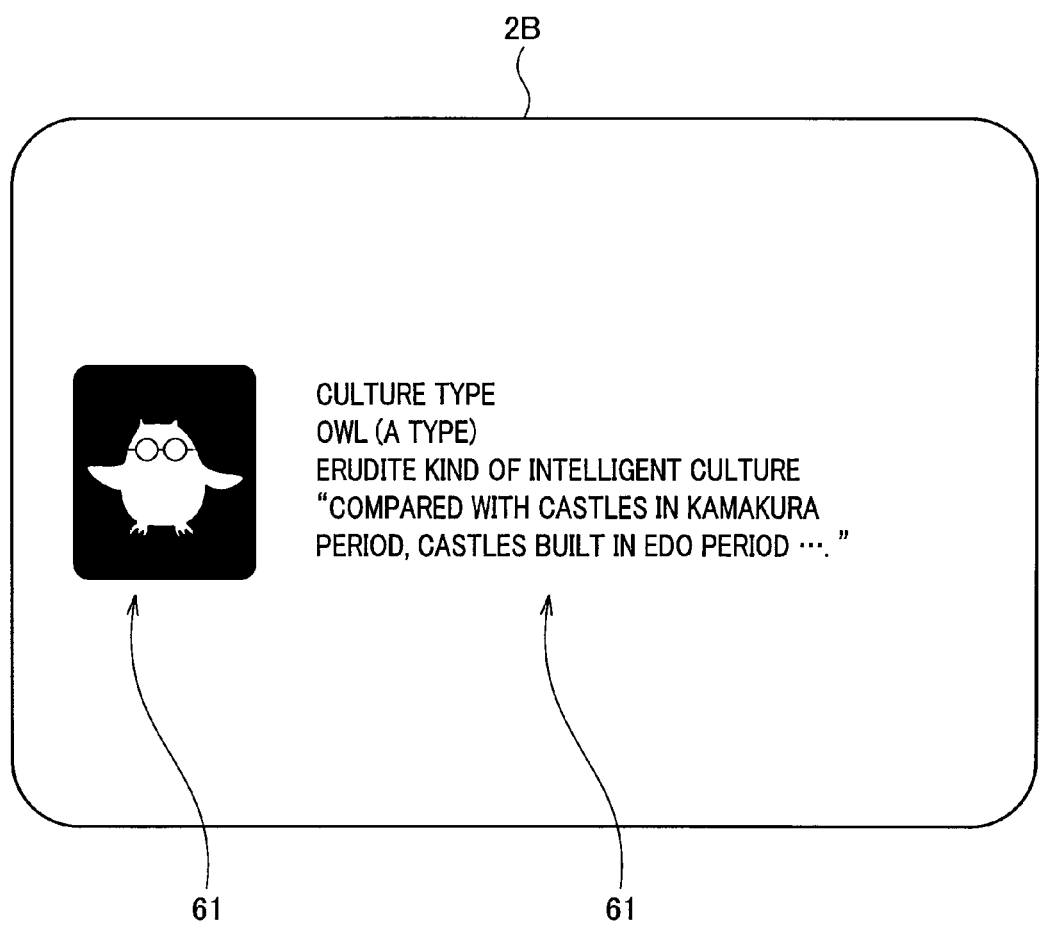
FIG. 6 is a diagram showing an example of the construction of a character explaining display screen displayed on the display panel.

FIG. 6 is a diagram showing an example of the construction of a character explanation display screen displayed on the display panel 2 of the car navigation device 1.

The character explanation display screen 2B is displayed by selecting a character icon 61 on the character selecting screen 2A (FIG. 5). Character explanation information 62 concerning the individuality of the character icon 61 is displayed on the character explanation display screen 2B together with the character icon 61. The character explanation information 62 contains information to explain the individuality of the character icon 61 such as the name of the character icon 61, personality and inclination of the character icon 61, words of self-introduction, etc.

The user may select a favorite character icon 61 on the basis of the shapes or colors of the character icons 61 displayed on the character selecting screen 2A, the character explanation information 62 displayed on the character explanation display screen 2B, etc. Here, the user is not necessarily required to select a character icon 61 which is near to his/her own personality or individuality. The user may select a character icon 61 having an individuality remarkably-different from him/her just for amusement, and suffers no restriction in selection of the character icon 61.

Figure 7:
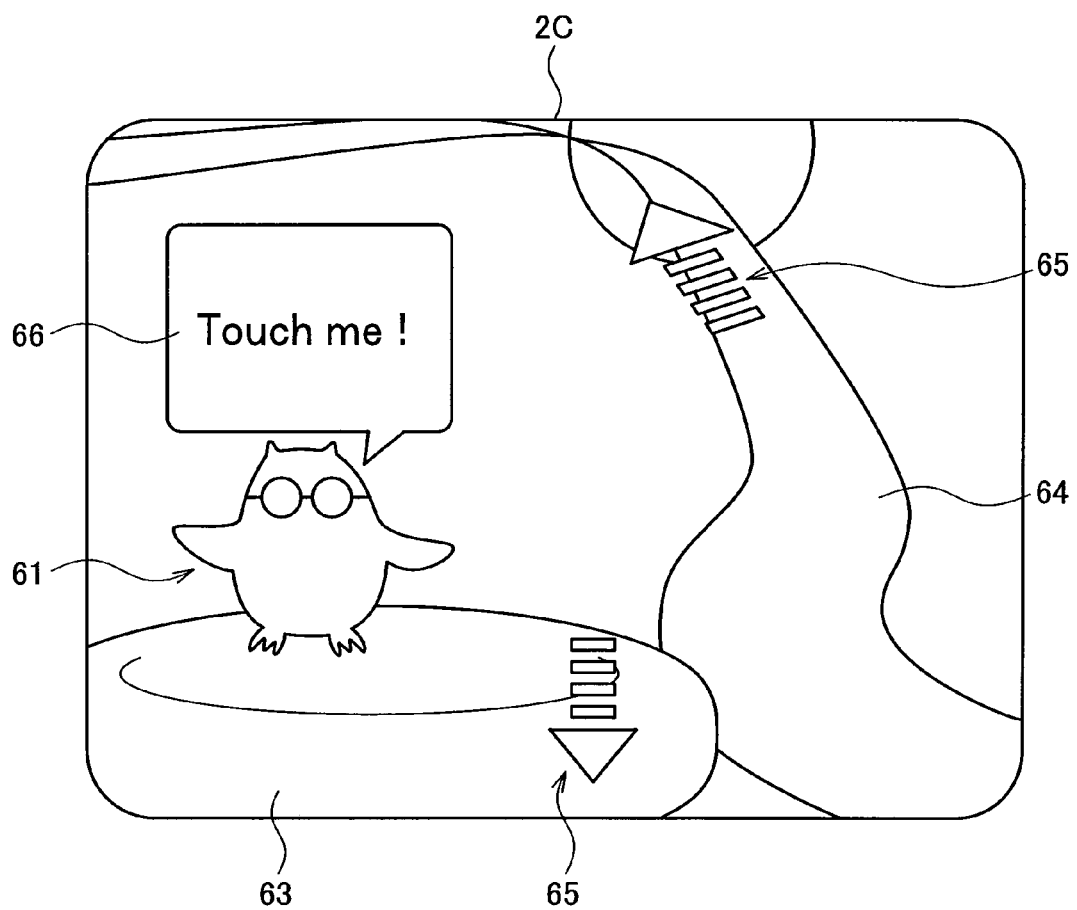
FIG. 7 is a diagram showing another example of the character selecting screen displayed on the display panel.
Figure 8:
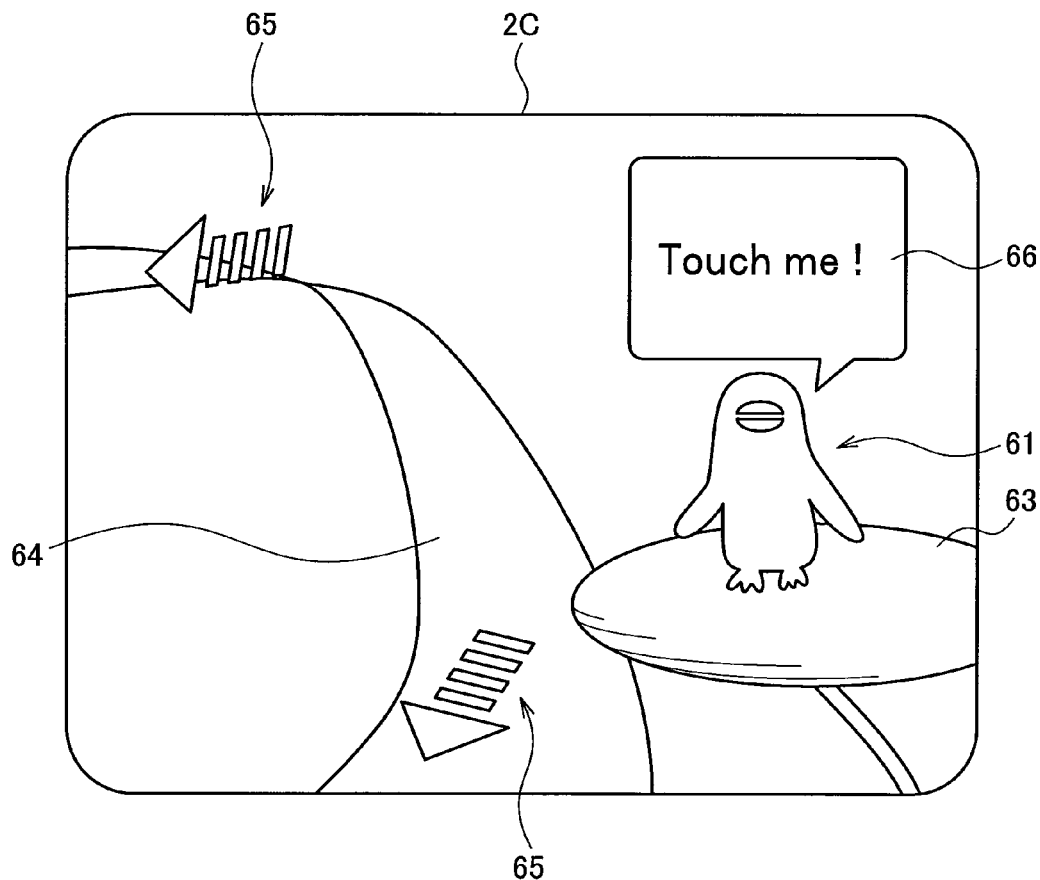
FIG. 8 is a diagram showing another example of the character selecting screen displayed on the display panel.

FIGS. 7 and 8 are diagrams showing another example of the character selecting screen displayed on the display panel 2 when the user selects a character.

A character selecting screen 2C is constructed by a virtual display area whose size corresponds to several times of a size which can be displayed in a lump on the screen, and a part of this virtual display area is displayed on the display panel 2. The virtual display area is provided with plural character sites 63 at fixed positions of the character icons 61. One character icon 61 is located at each character site 63. Furthermore, a path 64 imitating a road for connecting the character site 63 is displayed in the virtual display area described above.

A part of the virtual display area is displayed as the character selecting screen 2C on the display panel 2. One character site 63 and the character icon 61 located at this character site 63 are necessarily displayed on one character selecting screen 2C, and further a moving instruction icon 65 having an arrow shape for guiding a switching direction of the screen is displayed. When the user touches the moving instruction icon 65, the touch panel 24 detects this touch operation, and the screen displayed on the display panel 2 is switched. When the screen is switched, the screen is shifted from the style shown in FIG. 7 to the style shown in FIG. 8, for example, and another character icon 61 is displayed on the display panel 2. That is, the user can switch and display the character icon 61 by operating the moving instruction icon 65 to switch the screen under the state that the character selecting screen 2C is displayed. Then, under the state that a desired character icon 61 is displayed, the user can select a desired character by touching this desired character icon 61.

A message display 66 is displayed in such a speech balloon style representing words in the character icon 61. Various messages are displayed as words which the character speeches, and for example, explanation information stored in each record of the character data base 32 may be displayed in the message display 66. In this case, the user may estimate the individuality of the character by viewing the character array in the message display 66, and select the character.

Furthermore, when the character icon 61 is operated on the character selecting screen 2C shown in FIGS. 7 and 8, the explanation information concerning the character of the character icon 61 concerned may be displayed.

Figure 9:
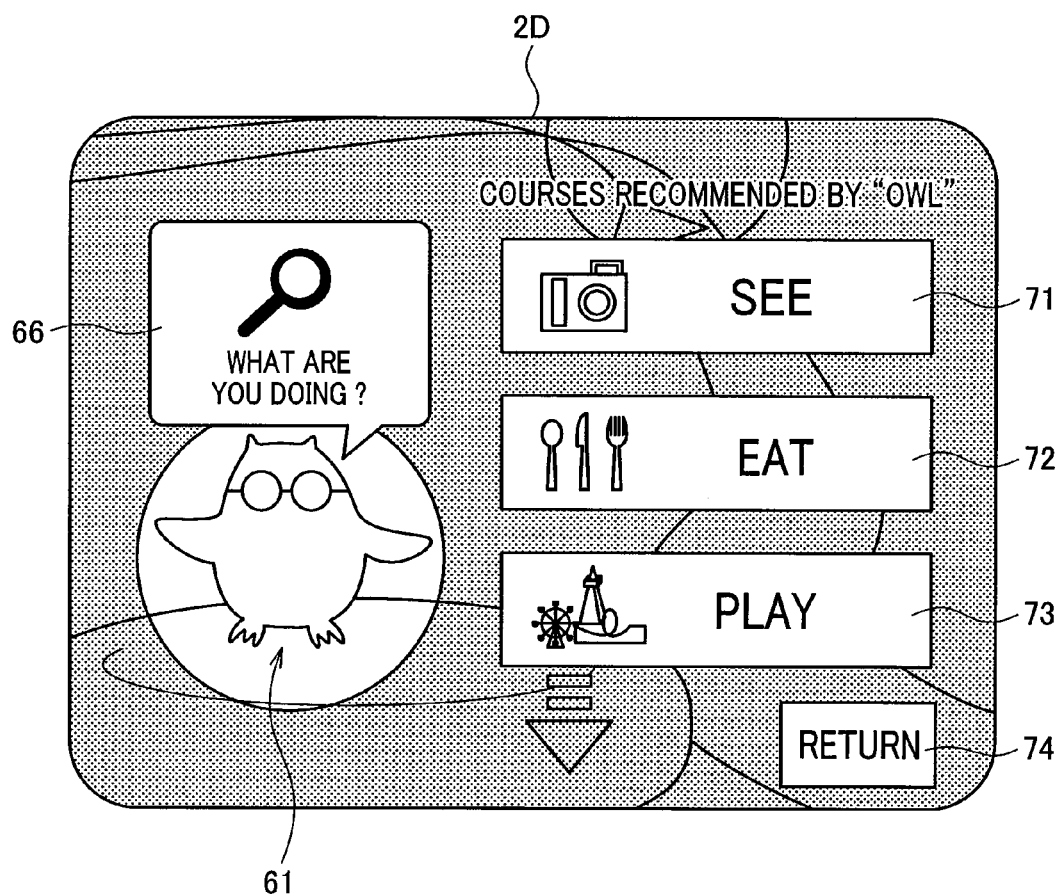
FIG. 9 is a diagram showing an example of the construction of an information display screen displayed on the display panel.

FIG. 9 is a diagram showing an example of the construction of an information display screen displayed after a character is selected on the character selecting screen.

An information display screen 2D shown in FIG. 9 is a screen on which the character selected by the user serves as a guide and proposes information concerning sightseeing facilities. The character icon 61 and a message display 66 for displaying a message from the character to the user are arranged on the information display screen 2D. In the example of FIG. 9, a message of "what are you doing" is displayed in the message display 66, and it is found that this is a screen for determining the object of the driving. Furthermore, buttons 71, 72 and 73 for specifying the type of a sightseeing facility as a destination are arranged. The button 71 is a button for specifying sightseeing facilities belonging to a genre of "see", the button 72 is a button for specifying sightseeing facilities belonging to a genre of "eat", and the button 73 is a button for specifying sightseeing facilities belonging to a genre of "play". A return button 74 for instructing to return to the screen which has been displayed just before is disposed on the information display screen 2D.

A title of "Course Recommended by Owl" is displayed on the information display screen 2D. When any one of the buttons 71, 72 and 73 is operated according to this title, the car navigation device 1 selects sightseeing facilities corresponding to the type of "see", "eat" or "play" from sightseeing facilities relevant to the individuality of the character selected by the user, and displays information on the selected sightseeing facilities.

The character selected in the example of FIG. 9 is "Owl". As shown in FIGS. 4 and 6, the individuality of the character "Owl" is featured as "culture type" and "erudite king of intellectual culture". Therefore, when any one of the buttons 71, 72 and 73 is operated on the information display screen 2D, the information of the sightseeing facilities belonging to the type of "see", "eat" or "play" are selected from the information of the sightseeing facilities relevant to the individuality of "culture type" and "erudite king of intellectual culture" according to the operated button, and displayed on the screen.

Figure 10:
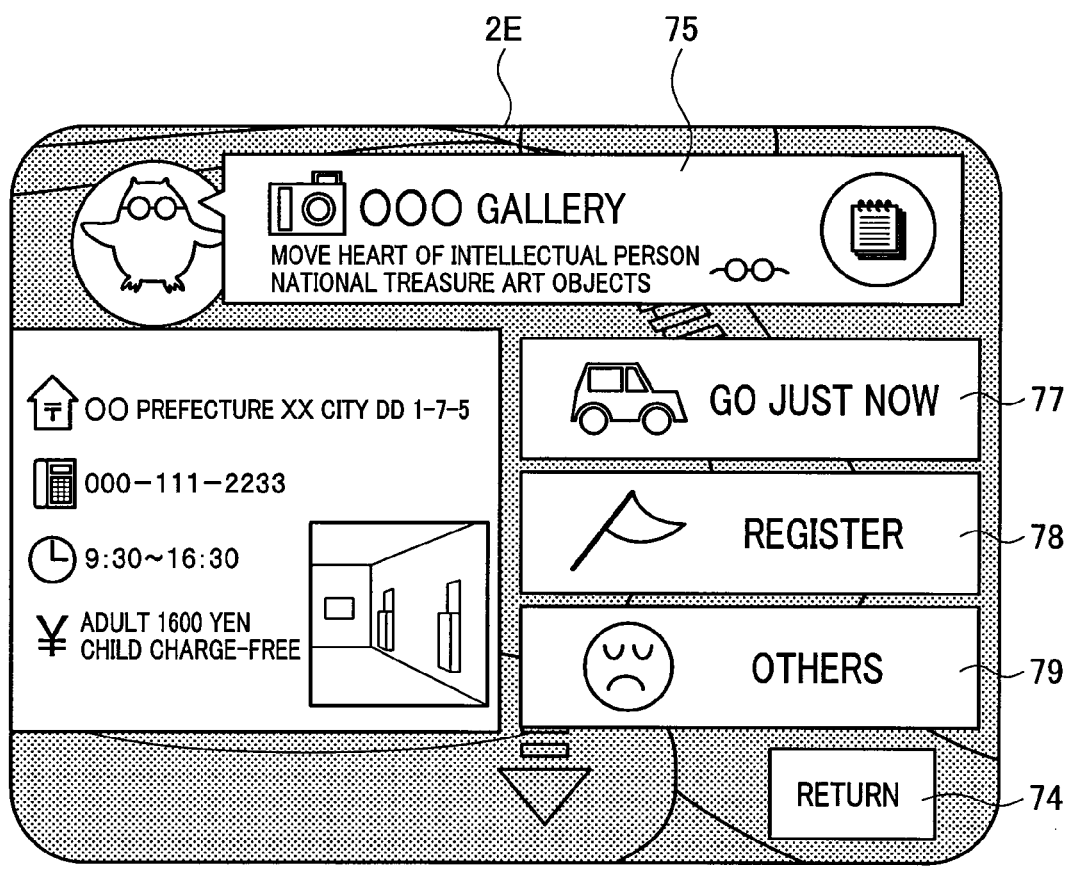
FIG. 10 is a diagram showing an example of the construction of a detailed information display screen displayed on the display panel.

FIG. 10 is a diagram showing an example of the construction of the detailed information display screen. A detailed information display screen 2E shown in FIG. 10 is displayed after any one of the buttons 71, 72 and 73 is operated on the information display screen 2D of FIG. 9, for example.

A detailed information display 75 for displaying information concerning the name, place (address), telephone number, business hours (operating hours), charge, etc. for one sightseeing facility, an image of the sightseeing facility, etc. is displayed on the detailed information display screen 2E. This sightseeing facility is selected from the sightseeing facilities relevant to the individuality of the character selected by the user. Here, a random selecting method, a method of selecting a sightseeing facility nearest to the current position detected by the GPS unit 11 or the like may be adopted as a method of selecting one sightseeing facility from the sightseeing facilities relevant to the individuality of the character.

That is, when the character icon 61 is selected and then the type of the sightseeing facilities is specified, according to a predetermined criterion, the car navigation device 1 displays, on the detailed information display screen 2E, information on a predetermined number of sightseeing facilities (in this case, one sightseeing facility) from the sightseeing facilities which are relevant to the individuality of the selected character and belong to the specified type.

On the detailed information display screen 2E, the sightseeing information displayed in the detailed information display 75 is the sightseeing information "recommended" by the character selected by the user.

In this case, the user merely selects the character icon 61 and the type, whereby only the information on a predetermined number of sightseeing facilities is selected, and thus the labor imposed on the user can be greatly omitted.

The name, etc. of a sightseeing facility and also a message of introducing the sightseeing facility by the character "Owl" selected by the user (in this case, "National Treasure Arts moving the hearts of intelligent persons") are displayed in combination on the detailed information display 75. This message may be contained in the record of each sightseeing facility of the sightseeing facilities data base 31. However, the storage unit 14 may be provided with a message data base in which a message of each character is stored, and a proper message may be selected from the message data base and displayed on the detailed information display 75.

Furthermore, the return button 74 for instructing the return to the just previously displayed screen is disposed on the detailed information display screen 2E.

A destination setting instruction button 77, a registering instruction button 78 and a cancel instruction button 79 are disposed on the detailed information display screen 2E.

The destination setting instruction button 77 is a button for instructing to set the sightseeing facility displayed in the detailed information display 75 as a destination of the navigation operation. When the detailed information display 75 is operated, the car navigation device 1 sets the sightseeing facility displayed in the detailed information display 75 as the destination, and starts the navigation operation to the destination.

The registering instruction button 78 is a button for instructing spot-registration of the sightseeing facility displayed in the detailed information display 75 so that the sightseeing facility concerned can be afterwards set as a via-point or a destination. When the registering instruction button 78 is operated, the car navigation device 1 sets the sightseeing facility being displayed in the detailed information display 75 as a registered point. This registered point is displayed as an icon on a map during the navigation operation, and it can be quickly called when a destination or a via-point is set or the like.

The cancel instructing button 79 is a button for instructing to display information of other facilities than the facilities which are currently displayed in the detailed information display 75. When the cancel instructing button 79 is operated, another sightseeing facility is elected, and the information of the newly selected sightseeing facility is displayed in the detailed information display 75.

In place of the above example, the car navigation device 1 may be constructed so that information on plural sightseeing facilities are displayed to be arranged on the display panel 2 according to the operation of the button 71, 72 or 73 displayed on the information display screen 2D, and when any one of these sightseeing facilities is selected, the detailed information display screen 2E is displayed.

FIG. 11 is a flowchart showing the operation of the car navigation device 1.

Particularly, FIG. 11 shows a series of operations concerning selection of a character before the navigation operation is started.

When the car navigation device 1 is powered on to start the operation thereof (step S11), the controller 10 displays the character icons 61 on the display panel 2 (step S12). In this step S12, the character selecting frame 2A shown in FIG. 5 or the character selecting frame 2C shown in FIGS. 7 and 8 is displayed, for example.

Here, when an operation of selecting and specifying any one character icon 61 is carried out by user's operation (step S13), the controller 10 detects this operation by the touch panel 24, and the character corresponding to the selected character icon 61 is set as a selected standard (step S14).

Subsequently, when an operation of setting and specifying a destination is carried out (step S15), the controller 10 starts the setting of the destination according to this operation (step S16). When the destination is set, the controller 10 displays a screen for specifying the type of the destination like the information display screen 2D shown in FIG. 9, for example.

When the operation of specifying the type of the destination is carried out (step S17), the controller 10 extracts information of sightseeing facilities relevant to the character as the selected standard from the sightseeing facilities data base 31. The information of the type specified in step S17 is extracted from the above extracted information (step S18), and displayed on the display panel 2 (step S19).

The processing of extracting the information of the sightseeing information relevant to the character set as the selected standard from the sightseeing facilities data base 31 by the controller 10 is executed by referring to the information of the relevant character field 43 shown in FIG. 3 to extract the corresponding record from the sightseeing facilities data base 31, for example. This processing may be the processing of executing word analysis between the information stored in the type field 53, the comment field 54 and the self-introduction field 55 of one record of the character data base 32 and the information of the detailed information field 46 of the sightseeing facilities data base 31 to calculate a relevance ratio, and then extracting the record of sightseeing facilities whose relevance ratio exceeds a predetermined threshold value.

Thereafter, when the information of the sightseeing facility extracted by the controller 10 is selected by the user and an instruction of setting it as a destination is made (step S20), the controller 10 sets the selected sightseeing facility as the destination in response to the instruction (step S21), and starts the navigation operation (step S22).

As described above, in the car navigation device 1, when the user selects his/her favorite character from the characters featured by the individualities, the navigation operation is executed according to the individuality of the selected character. Specifically, the information of the sightseeing facilities relevant to the individuality of the selected character is selected, and displayed as destination candidates on the display panel when a destination is set or the like. Furthermore, the selected character icon 61 can be displayed during the navigation operation, and further the message of the character can be displayed on the display panel 2 during the navigation operation. In addition, when a via-point is set during the navigation operation or when the destination is changed, the character icon 61 and the message of the character can be also displayed. Furthermore, the message displayed in the message display 66 or the like together with the character icon 61 may be set to be matched with a speech pattern corresponding to the individuality of the character.

As described above, according to the car navigation device 1 of the embodiment to which the present invention is applied, plural characters featured by individualities are set in advance, and the character icons 61 corresponding to the respective characters are displayed on the display panel 2. When any one (some) of the plural character icons 61 displayed on the display panel 2 is (are) selected by the user, the sightseeing information relevant to the individuality (individualities) of the selected character icon(s) 61 is (are) selected and displayed. That is, the information is selected from the information concerning a large number of sightseeing facilities on the basis of the individuality of the character (s) selected by the user, and thus the user can quickly select sightseeing facilities according to user's intention.

Here, the car navigation device 1 operates according to the vague criterion that the selection of sightseeing facilities is made relevant to the individuality of the character. Therefore, a clear and uniform criterion such as the genre, the store name, the price or the like is not required, and thus it is unnecessary for the user to specify a clear criterion. Accordingly, there is an advantage that information of sightseeing facilities is selected with reflecting user's intention by a user's simple action of intuitively selecting a character icon 61 on the display panel 2. Furthermore, when the individuality featured by the character is brought with complexity/manifold aspects, a feature different from an individuality expected when the user selects a character icon 61 is brought out. As a result, sightseeing facilities which the user does not intend can be selected and displayed. In this case, an unexpected choice can be made to produce an amusement.

Furthermore, the car navigation device 1 can display plural character icons 61 on the same screen like the character selecting screen 2A of FIG. 5 or display respective character icons 61 on different screens like the character selecting screen 2C of FIGS. 7 and 8. Accordingly, a simple screen construction can be adopted in consideration of list display performance, and also the amusement can be enhanced by giving variety to the screen construction. Accordingly, there is an advantage that the degree of freedom of design can be enhanced.

Furthermore, the character icon 61 is displayed on the display panel so as to have a color, a shape or the combination thereof which evokes the individuality by which the character is featured. Therefore, the user can intuitively select the character icon 61 which is matched with the user's preference or feeling without seeing the explanation of the individuality of each character.

Furthermore, the car navigation device 1 can display not only the character icon 61, but also the information explaining the individuality of the character on the display panel 2 like the character explanation display screen 2B of FIG. 6. The user can know the individuality of the character by viewing the character explanation display screen 2B, and then easily select a desired character icon 61. Therefore, proper information is supplied to a user who wants sufficient information, thereby assisting user's determination when the character icon 61 is selected, so that a comfortable operation can be implemented.

Furthermore, in the car navigation device 1, with respect to each record of the sightseeing facilities data base 31, the information representing the types of the sightseeing facilities are stored in the facility type field 44, and the sightseeing facilities can be classified every type on the basis of the information of the facility type field 44. Therefore, when the user selects the character icon 61 and specifies the type on the information display screen 2D of FIG. 9, the car navigation device 1 selects the sightseeing facilities relevant to the individuality of the selected character and further selects the sightseeing facilities of the selected type from the selected sightseeing facilities. Accordingly, the sightseeing facilities are selected on the basis of both the individuality of the character selected by the user and the type specified by the user, and thus there is an advantage that the sightseeing facilities can be selected with reflecting user's preference and intention more greatly.

Each record of the sightseeing facilities data base 31 contains the relevant character field 43 representing the relevant character, and thus the sightseeing facility relevant to the individuality of the character selected by the user can be quickly and surely selected on the basis of the information stored in this relevant character field 43.

In this embodiment, figures imitating animals are used as the character icons 61, however, the present invention is not limited to this style. A simple figure such as a circle, a polygon or the like, character of various kinds of languages containing hieroglyphic characters, etc. may be used. All the character icons 61 may be designed as figures having the same shape, and colors evoking the individualities of characters may be given to the respective character icons 61 so that the respective character icons 61 can be discriminated from one another.

Furthermore, in this embodiment, one character icon 61 is selected on the character selecting screen 2A, 2C. However, the present invention is not limited to this style. For example, when an operation of instructing non-selection of any character icon 61 is executed, a normal navigation operation may be executed without using any character icon 61.

In the above embodiment, before the navigation operation is started, the character icon 61 is displayed and a character is selected. However, this invention is not limited to this style, and it may be modified so that the screen for selecting the character icon 61 can be called during the navigation operation. Furthermore, in the normal destination setting operation, etc. of the car navigation device 1, when some sightseeing facility is selected, the character icons 61 of the characters having the individualities relevant to this sightseeing facility may be displayed on the display panel 2. With respect to the character featured by the individuality, not only the character icons 61, but also voices may be stored in association with one another in the character data base 32. In this case, the corresponding voice may be output from the car navigation device 1 when a character icon 61 is displayed or selected. In the above embodiment, various character icons 61 are displayed on a predetermined screen. However, the designed of the screen may be changed every character icon 61. In this case, information for defining the screen construction may be stored in the character data base 32 together with the image data of the character icons 61 in the character data base 32, and when the controller 10 reads out the image data of the character icon 61, the controller 10 may obtain and process the information for defining the screen construction.

Furthermore, in the above embodiment, the present invention is applied to the car navigation device 1 which is mounted in a vehicle and performs the route guidance for the vehicle. However, the present invention is not limited to this style. For example, the present invention may be applied to a handy type portable navigation device around which a person carries, and also the present invention may be applied to a cellular phone, PDA, etc. which implement a navigation function by detecting the current location by GPS or the like because these are some type of navigation devices. Furthermore, the detailed constructions of hardware of the car navigation device 1 may be arbitrarily altered.

The invention claimed is:

1. A navigation device for guiding a moving object, the navigation device comprising:
   means for storing sightseeing information;
   means for selectively displaying plural character icons featured by respective individualities on a display screen;
   means for selecting, from the means for storing, sightseeing information containing information on facilities in association with the individuality of a character icon selected from the plural character icons displayed on the display screen; and
   means for displaying the selected sightseeing information on the display screen,
   wherein one facility may be relevant to plural character icons.

2. The navigation device according to claim 1, wherein the means for selectively displaying displays the plural character icons on the display screen at the same time or at different times.

3. The navigation device according to claim 1, wherein the character icon is displayed on the display screen with a color, a shape or the combination thereof which evokes the individuality by which the character icon is featured.

4. The navigation device according to claim 1, wherein the means for selectively displaying displays explanation information to explain the individuality by which the character icon is featured.

5. The navigation device according to claim 1, wherein the means for storing stores the sightseeing information by type, and the means for selecting selects the sightseeing information relating to the individuality of the selected character icon from the means for storing, and also further selects the sightseeing information of an indicated type from the selected sightseeing information.

6. The navigation device according to claim 1, wherein the means for storing stores character icon relevant information representing the selected character icon in advance, and the means for selecting selects sightseeing information relating to the individuality of the selected character icon from the means for storing on the basis of the character icon relevant information stored in the means for storing sightseeing information.

7. A method of controlling a navigation device for guiding a moving object, the method comprising steps of:
   storing in a storage medium sightseeing information;
   selectively displaying plural character icons featured by respective individualities on a display screen;
   selecting, from the storage medium, sightseeing information containing information on facilities in association with the individuality of a character icon selected from the plural character icons displayed on the display screen; and
   displaying the selected sightseeing information on the display screen
   wherein one facility may be relevant to plural character icons.

\* \* \* \* \*